(12) United States Patent
Hoyos et al.

(10) Patent No.: US 12,728,870 B2
(45) Date of Patent: Sep. 8, 2026

(54) SYSTEMS AND METHODS TO MONITOR AND IMPROVE DRIVING BEHAVIOR

(71) Applicant: HATS GROUP LLC, San Juan, PR (US)

(72) Inventors: Hector Hoyos, Ridgefield, CT (US); Ian Hoyos, San Juan, PR (US)

(73) Assignee: Hector Hoyos, Ridgefield, CT (US)

( * ) Notice: Subject to any disclaimer, the term of this patent is extended or adjusted under 35 U.S.C. 154(b) by 0 days.

(21) Appl. No.: 18/617,759

(22) Filed: Mar. 27, 2024

(65) Prior Publication Data

US 2024/0367662 A1 Nov. 7, 2024

Related U.S. Application Data

(60) Provisional application No. 63/577,498, filed on May 1, 2023.

(51) Int. Cl.

| | |
|---|---|
| ***B60W 40/09*** | (2012.01) |
| ***B60K 35/28*** | (2024.01) |
| ***B60W 50/14*** | (2020.01) |
| ***G06V 20/59*** | (2022.01) |
| *B60W 40/08* | (2012.01) |

(52) U.S. Cl.

CPC ............ *B60W 40/09* (2013.01); *B60K 35/28* (2024.01); *B60W 50/14* (2013.01); *G06V 20/597* (2022.01); *B60K 2360/195* (2024.01); *B60K 2360/569* (2024.01); *B60W 2040/0818* (2013.01); *B60W 2050/143* (2013.01); *B60W 2520/10* (2013.01); *B60W 2540/229* (2020.02); *B60W 2556/50* (2020.02)

(58) Field of Classification Search

CPC ...... B60W 40/09; B60W 35/28; B60W 50/14; B60W 2040/0818; B60W 2050/143; B60W 2520/10; B60W 2540/229; B60W 2556/50; G06V 20/597; B60K 2360/195; B60K 2360/569

See application file for complete search history.

(56) References Cited

U.S. PATENT DOCUMENTS

| | | |
|---|---|---|
| 8,805,707 B2 | 8/2014 | Schumann, Jr. et al. |
| 9,315,195 B2 | 4/2016 | Armitage et al. |

(Continued)

OTHER PUBLICATIONS https://www.life360.com/.

(Continued)

*Primary Examiner* — Mohamed Barakat

(57) ABSTRACT

A system and method to reduce driver distraction caused by the use of mobile devices while driving. The system and method provide a range of features to promote safe driving practices for drivers while providing valuable data to the intended recipient/interested party. The system and method are configured to block a driver's smartphone during operation of the vehicle, assess and evaluate driver behavior during operation of the vehicle, store data for later access and transmit behavioral data to an interested party. The system can also include an app which provides training, education, enforcement, navigation and safety, thereby providing technology which reduces the tragic events resulting from distracted driving and utilizes technology to neutralize the negative aspects of smartphone use during vehicle operation.

20 Claims, 8 Drawing Sheets

(56) References Cited

U.S. PATENT DOCUMENTS

| | | | | |
|---|---|---|---|---|
| 10,414,377 | B2 | 9/2019 | Hoyos et al. | |
| 10,430,745 | B2 | 10/2019 | Rani et al. | |
| 10,433,147 | B2 | 10/2019 | Keil et al. | |
| 10,467,488 | B2 * | 11/2019 | Sicconi | G06V 40/20 |
| 10,540,883 | B1 | 1/2020 | Keil et al. | |
| 10,614,430 | B2 | 4/2020 | Armstrong | |
| 10,805,315 | B2 | 10/2020 | Kirkham et al. | |
| 11,372,426 | B2 | 6/2022 | Shih et al. | |
| 11,578,990 | B1 | 2/2023 | Chintakindi et al. | |
| 2014/0191858 | A1 * | 7/2014 | Morgan | G07C 5/0816 340/439 |
| 2017/0201619 | A1 * | 7/2017 | Cohen | H04M 1/72463 |
| 2017/0225677 | A1 | 8/2017 | Yoshida et al. | |
| 2017/0238129 | A1 * | 8/2017 | Maier | H04W 4/14 455/404.2 |
| 2017/0332347 | A1 | 11/2017 | Boss et al. | |
| 2017/0365007 | A1 * | 12/2017 | Huls | H04W 4/40 |
| 2019/0210522 | A1 * | 7/2019 | Huang | B60K 35/22 |
| 2019/0270459 | A1 * | 9/2019 | Williams | H04M 1/72454 |
| 2020/0013244 | A1 * | 1/2020 | Rosenbaum | G07C 5/008 |
| 2022/0048432 | A1 * | 2/2022 | Switalski | G08G 1/205 |

OTHER PUBLICATIONS https://lifesaver-app.com/.
https://onmyway.com/.
https://www.statefarm.com/customer-care/download-mobile-apps/drive-safe-and-save-mobile/.
apps.apple.com/ca/app/safest-driver/id1481479101.

* cited by examiner 170
177
178
180
172
174
176
182
3:07
Back to Trips
MIRAMAR
GANDUL
BOLIVAR
HATO REY NORTE
GOBERNADOR PINERO
Trip Distance - 4.7 MILES
A San Juan 1:11 PM
B Guaynabo 1:22 PM
1 0 1 0 0
Harsh Acceleration
Harsh Braking
Harsh Cornering
Speeding
Phone Handling
Acceleration
Well done! You mostly accelerated smoothly. Try to avoid a few of the quicker starts to reach perfection.

SYSTEMS AND METHODS TO MONITOR AND IMPROVE DRIVING BEHAVIOR

This application claims priority to provisional application Ser. No. 63/577,498, filed May 1, 2023, the entire contents of which are incorporated herein by reference.

BACKGROUND

Field of the Invention

This application relates to systems and methods to improve driving behavior, and more particularly, to systems and methods for preventing driver distraction and monitoring driving behavior.

Background of Related Art

Starting to drive a car as a teenager marks an exciting milestone in one's life, fostering newfound independence and a sense of personal responsibility. For parents, it's a moment of pride and concern, as they prioritize their child's safety and well-being which is not easy in an age of increasing distraction while driving, especially brought on by an addicting smartphone in everyone's hands.

The dangers of texting and driving are well-known, but the latest statistics in the U.S. alone on this issue show that the situation is getting worse. In 2022, over 16% of drivers admitted to texting while driving, and almost 11 teenagers die every day due to this practice. Shockingly, texting and driving is as bad as drinking four beers, and distracted driving causes 35% more injuries than drunk driving. In 2022, over 500 people died in crashes caused by cell phone-related distractions, and over 650,000 drivers use their cell phones while driving at any given moment. The statistics show that distracted driving is an epidemic that puts many people at risk, and the full consequences of using the phone behind the wheel is not universally understood.

A total of 47 states have enacted a texting ban while only 16 states have a ban on phone usage while driving and hands-free devices for all drivers. Regardless, such bans are not very effective because human nature is what it is and people too often ignore such rules.

The statistics are tragic, and this is not a problem limited to the United States. This is a very serious global problem which especially keeps many parents in a quiet state of anxious desperation.

The following statistics demonstrate the gravity of the distracted driving problem:

Fatalities involving texting while driving comprised 9% of all fatal crashes nationwide.

7% of drivers are using cell phones (including making a phone call) at any given time.

Texting while driving increases by 400% a driver's time spent with their eyes off the road.

The use of a cell phone while driving caused an estimated 2+ million car crashes in the U.S. in 2022.

Including the cost to people lives, these crashes were responsible for $129 billion-15 percent of the overall societal damage caused by motor vehicle crashes. This number only goes up after a primary offense.

Even more statistics show the seriousness of the problem:

A teenager dies every 4 hours in an auto crash in the U.S.

In 2021, 280,400 drivers ages 15-19 had auto accidents, with 2,116 teen drivers killed, 1,065 passengers killed, 1,666 occupants of other vehicles killed, and 227,000 injured.

56% of teens admit to talking on cell phones while driving.

39% of teen drivers text, email, and post while driving.

48% of teens report being in a car when the driver was texting.

The smartphone usage problem is not limited to teenagers. In 2020, crashes with distracted drivers across all age groups resulted in 10,546 fatalities, 1.3 million nonfatal injuries, and $98.2 billion in economic costs, accounting for 29% of all crash costs. Estimates of drivers include 8.3 million teenagers ages 16-19, 17.4 million young adults ages 20-24, 366,550 school bus drivers, 1.7 million rideshare drivers (Uber and Lyft) and 3.5 million truck drivers.

Many existing "safe-driving" mobile apps attempt to solve this problem of distracted driving caused by smartphone usage but come up short. These so-called safe driving apps claim to block smartphone use, but they often require interaction with the app itself, which can be just as distracting and dangerous as the behaviors they're supposed to mitigate. In some of these apps, a curtain over the screen hides the apps, however, they can be simply removed by the driver swiping up to remove the curtain, after which they display a message on the screen that asks the user to keep their eyes on the road, or they give the user a choice to unlock the apps while the vehicle is in motion which increases the risk of getting into an accident by distracting the driver while driving as it asks the driver to interact with their application.

Furthermore, these apps do not address the underlying habits and lack mechanisms to enhance the driver's self-awareness of their driving behavior. Thus, these products, although advertised as "Safe Driving" do not really block apps on smartphones while driving. They ignore the addictive and usage relationship people have with their smartphone in a moving vehicle. Even worse, they promote destructive behavior by requiring unsafe driver interaction with their own app while driving, creating distractions that increases the risk of deadly accidents. Human nature is such that we cannot trust ourselves to not text and drive, post and drive or take a quick glimpse at that "very important" last minute e-mail.

Life360 is an app that is currently being utilized, designed to give parents peace of mind by adding location sharing to their child's phone. However, it is commercialized for use for tracking and not for safe driving. Life360 detects phone calls, texting, social apps, and other use of the phone while driving, but does not detect use when the vehicle is in hands-free/BT mode. Life360 does provide some driver behavioral data such as high speed, phone usage, hard braking, and rapid acceleration, however, it does not block apps while driving to prevent distraction.

The need exists for a system that can effectively reduce driving distraction which does not rely on user choice. Further, the need exists to not only reduce driving distraction in real time but alter driver behavior to reduce future driving distraction.

SUMMARY OF INVENTION

The present invention overcomes the deficiencies and disadvantages of the prior art. The present invention provides a system configured to a) block a driver's smartphone during operation of the vehicle, b) assess and evaluate driver behavior during operation of the vehicle; c) transmit behavioral data to an interested party after a driving event and/or in real time; and d) store behavior data for later access and evaluation.

Overall, the system of the present invention provides a comprehensive solution to prevent driver distraction and insecurity caused by the use of mobile devices while driving. The system of the present invention provides a range of features to promote safe driving practices for teenagers (and others) while providing valuable data to the intended recipient/interested party such as parents or guardians.

The system of the present invention also includes an app which provides training, education, enforcement, navigation and safety ("TEENS"), providing technology which reduces the tragic events resulting from distracted driving and utilizes technology to neutralize the negative aspects of the smartphone which inadvertently has become the technology responsible for so many tragedies.

Although specifically designed to promote safe driving practices for teenagers the system of the present invention can also be utilized for use by others such as in corporate fleets as such data can be evaluated by bosses, supervisors and other designated company personnel. The system does not rely on the user's self control to refrain from using the phone while operating the vehicle, but rather implements technology to block such usage, and further collects data on the drive during vehicle operation to inform the necessary individuals as well as inform the vehicle operator to incentivize driving behavior change.

In some embodiments, the system generates alarms to alert the driver if adverse driving behavior is detected. In some embodiments, such alarms can also provide an alert to the remote data recipient, e.g., parents, guardian, bosses, employers, etc. It can monitor the driver behavior and location, providing location and speed alerts to the data recipient, e.g., parents, guardians, or bosses, in the event of unsafe driving or at the request of the data recipient.

The mobile app of the system of the present invention can also provide a comprehensive solution to help teenagers prepare, practice, and maintain a distraction-free environment while driving. It can offer exam prep, and safe driving habits, in addition to data collection and sharing of driver activity, safety enforcement, and emergency response features.

As described below, it is a local-first (cloud independent) mobile app that leverages real-time data to analyze a driver's level of safety while driving generating a safety index, hereinafter referred to as the "ROTAMMI INDEX," or more simply "RI.". It provides the ultimate protection against distractions by uniquely blocking the functionality of a smartphone's apps while the vehicle is in motion. The index is created by the data collected by the mobile phone utilized to compute a driving score.

Device restriction in its broadest sense is achieved by the system of the present invention by analyzing in real-time a smartphone's sensor data to detect when a user is operating a motor vehicle and subsequently restrict access/usage of the apps and device. In preferred embodiments, an exception for emergency situations is provided even if the device restriction is initiated. Since the first step in avoiding becoming a traffic accident statistic is to avoid texting while driving and/or making calls on your smartphone, the system of the present invention restricts such use as it automatically blocks apps to thereby eliminate phone interaction while driving. It should be noted that certain smartphones enable blocking of all apps, while other smartphones do not enable such universal blocking. How the system of the present invention effectively addresses this via its RI evaluation is discussed in detail below.

Thus, in summary, the system of the present invention achieves multiple objectives/benefits: 1) reduces risk of accidents as it directly decreases distraction-related incidents; 2) educates users to foster long-term behavioral change; and 3) provides adaptable safety controls as it offers complete or selective app blocking. It should be appreciated that in preferred embodiments the system achieves all of these three functions/objectives, however, in alternate embodiments, not all three functions are provided, e.g., only objective #1 and objective #3, which would still provide advantages over current systems.

In accordance with one aspect of the present invention, a method for reducing or preventing driver distraction during operation of a vehicle by a driver is provided, the method comprising: a) blocking use one or more apps on the smartphone while the driver is operating the vehicle; and b) monitoring a driving behavior of the driver during operation of the vehicle.

In some embodiments, the method further includes registering on the smartphone driver information of the driver.

In some embodiments, the step of blocking use of one or more apps automatically occurs when the vehicle exceeds a threshold (predetermined) speed or a threshold (predetermined) acceleration. Such speed threshold can be for example about 10 mph, although other predetermined/threshold speeds are also contemplated.

In some embodiments, vehicle motion is detected to initiate the blocking of the apps using core location API (Application Programming Interface) to determine velocity. For example, detected motion of above about 1.5 meters/second (slightly above walking speed) can initiate the blocking, although other threshold velocities can be utilized.

In some embodiments, within a predetermined number of seconds of the vehicle coming to a full stop, the apps are unblocked, and then re-blocked when sufficient vehicle speed, velocity and/or acceleration is detected.

In some embodiments, when the one or more apps are blocked in response to operation of the vehicle, emergency directed calls are still enabled to ensure communication is available in case of an emergency situation, thereby overriding blockage of calls from the smartphone. In some embodiments, the method further comprises automatically detecting the change in G-Force pressure (using the device's gyroscope) and in response automatically alerting emergency services to the location of the vehicle.

In some embodiments, a camera of the smartphone monitors the behavior of the user, the behavior being for example a direction the driver is looking. In some embodiments, the method further comprises the step of generating an alarm if the direction the driver is looking is outside a predetermined parameter. An additional camera, in wireless communication (e.g., Bluetooth) with the smartphone, can be mounted in the vehicle to supplement the smartphone camera to assist in detecting driver viewing direction.

In some embodiments, the method further comprises identifying a GPS location of the driver and vehicle, and generating notifications for estimated time of arrival and unusual patterns of driving. The estimated time of arrival data can be utilized to assess the speed of the vehicle during the trip.

In some embodiments, the method further includes generating alarms if driving behavior is outside a predetermined parameter, wherein the alarm is transmitted to the driver within the vehicle and to a computing device remote from the vehicle. For example, an alarm can be generated if the driver exceeds the speed limit, and the alarm can be transmitted to the driver within the vehicle to alert the driver to slow down as well as to a computing device of the data recipient/interested third party remote from the vehicle as an indicator of driving behavior. Thus, driving behavior during operation of the vehicle is assessed. e.g., by comparative analysis to desired behavior, speed, acceleration, etc., and the data collected for such assessments is transmitted to the data recipient. Such data can also be stored in the smartphone and/or remote computing device. The measured parameters are compared to a threshold and an alarm is initiated if one or more of the parameters exceeds the threshold.

In some embodiments, an index created by scoring of driving behavior is provided. For example, the method can further include the step of accumulating data in real time of the driver behavior and generating a calculated index of behavior. The index can be based on a range of values for a particular driver behavior, and an alarm can be actuated if the driver behavior exceeds a threshold, e.g., is outside a range or numeric value. In some embodiments, in calculating the index via scoring various parameters of driving behavior, various parameters are weighted differently. The various parameters scored for creating the index can include for example one or more of the following: distraction, speed, acceleration, cornering and braking. For example, the parameter of distraction can be weighted greater than other parameters, the parameter of distraction including one or more of placing calls, receiving calls, and utilization of one or more of the other apps which are not blocked by the system/app of the present invention.

The driving behavior determined by a series of measured parameters can be stored in memory on the smartphone. In some embodiments, the measured parameters utilize a predetermined index of values, and the data is transferred to a data recipient/analyzer (pre-designated interested third party) remote from the vehicle. In some embodiments, the data collected from the series of measured parameters is transferred in real time to the data recipient(s) remote from the vehicle, and such data can be stored on the recipient's computing device.

In preferred embodiments, the smartphone app of the system is a local first app reading and writing data without going over a network.

In some embodiments, data collected of the driver behavior is communicated to an insurance company. In some embodiments, the insurance company servers send repeated requests for data to the smartphone.

In accordance with another aspect of the present invention, a non-transitory computer implemented system executable by a processor is provided, the system comprising executing the operations of: a) registering driver information on a computing device in the vehicle; b) blocking use of select apps on the computing device while the driver is operating the vehicle beyond a threshold speed; c) collecting data on driving behavior of the driver during operation of the vehicle beyond the threshold speed; d) storing the data in memory on the computing device; and e) transmitting the data to a remote computing device for monitoring of the data to assess driving behavior of the driver.

In some embodiments, the system further comprises generating a score based on one or more parameters of the driving behavior, the score accessible to a data recipient remote from the vehicle. The score comprises a rating of several driving behaviors, and in some embodiments, the driving behaviors are not evenly weighted. In some embodiments, the data is transmitted to an insurance company. Scoring/calculation of a driver behavior index can also be provided.

In some embodiments, a comparative analysis of one or more individual scores to a desired amount resulting in a score outside the desired amount will automatically trigger an alarm, e.g., an audible alarm, to the driver, and in some instances, can also be transmitted to a remote data recipient.

In some embodiments, when the vehicle slows down below the threshold speed, one or more of the blocked apps on the computing device are unblocked, and are re-blocked when the vehicle speed returns above the threshold.

In accordance with another aspect of the present invention, a system for reducing vehicle accidents is provided comprising executing the operations of: a) blocking use of apps on a computing device within a vehicle while the driver is operating the vehicle; b) tracking a location of the driver and generating notifications to the driver and a remote computing device outside the vehicle for estimated time of arrival and unusual patterns of driving; c) collecting data on driver distraction during operation of the vehicle when the driving speed exceeds the threshold speed; d) storing the data in memory on the computing device, the data accessible to the driver and an individual remote from the vehicle; and e) transmitting the data to a remote computing device for monitoring of the data to assess driving behavior of the driver.

In some embodiments, step (a) of blocking use of the apps occurs when the driving speed exceeds a predetermined speed. In some embodiments, when the driving speed falls below the threshold speed, data is not collected and one or more of the blocked apps on the computing device are unblocked, but data collection automatically resumes and the apps are re-blocked when the speed once again exceeds the predetermined speed.

In some embodiments, driver distraction actions detected include use of the computing device in the vehicle and not looking at the road.

In some embodiments, the system further collects additional data of other driving behavior such as speed, acceleration, braking, cornering, etc., and this data is compiled, scored and quantified, along with scoring and quantification of driver distraction, to provide an overall driving score for rating the driver. Such overall score can be useful for parents and guardians. It can also be useful in companies to assess their drivers, e.g., delivery drivers, Uber and Lyft drivers, etc. It can also be useful for insurance companies in setting insurance rates. Thus, such scores can alert drivers and data recipients of subpar driving behaviors in real time as well as provide an education tool to improve driving behaviors.

BRIEF DESCRIPTION OF THE DRAWINGS

So that those having ordinary skill in the art to which the subject invention appertains will more readily understand how to make and use the apparatus (device) disclosed herein, preferred embodiments thereof will be described in detail hereinbelow with reference to the drawings, wherein.

DETAILED DESCRIPTION OF THE PREFERRED EMBODIMENTS

Figures 1A, 1B:
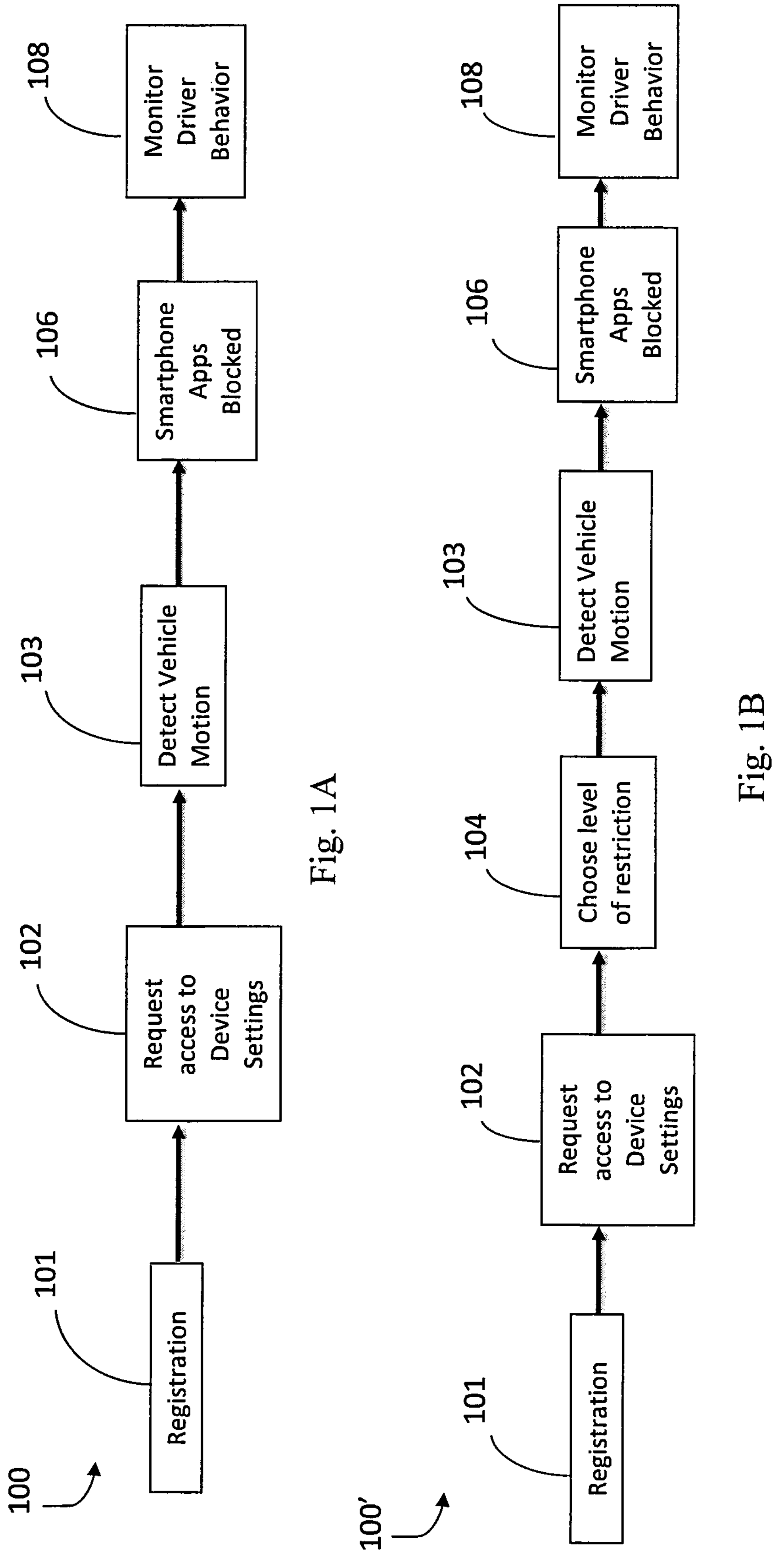
FIG. 1A is a flow chart of the overall system in accordance with an embodiment of the present invention.
FIG. 1B is a flow chart of the overall system of the present invention in accordance with an alternate embodiment enabling selection of restriction levels.

The present invention provides a system configured to a) block a driver's smartphone during operation of the vehicle, b) assess and evaluate driver behavior during operation of the vehicle; c) transmit data to the driver and/or interested party in real time related to such driver behavior; and d) collect and store driver behavior data for later access. The data transmission enables the active monitoring of driver behavior during operation of the vehicle. The data can be transmitted to an interested party for informational purposes, monitoring purposes and security purposes as described in detail below.

The present invention is directed to a computer implemented system and method for improving driving behavior via both monitoring such behavior and preventing driver distraction during operation of the vehicle. This is achieved with a system including a mobile application on a computing device such as a mobile device, e.g., a smartphone, smartwatch, augmented reality headset, which blocks other mobile applications during operation of the vehicle. Note that although the system described is smartphone based, it is also contemplated that other computing devices can be utilized by the driver to achieve the functions and objectives of the systems described herein.

Machine learning can be utilized to interpret the driver's habits and behavior and adjust behavioral parameters adaptable for individual drivers. This is described below.

As noted above, many existing "safe-driving" apps claim to block smartphone use, but they often require interaction with the app itself, which can be just as distracting and dangerous as the behaviors they are supposed to mitigate. Furthermore, these apps do not address the underlying habits and lack mechanisms to enhance the driver's self-awareness of their driving behavior. Existing "safe-driving" apps are insufficient, often requiring interaction that contributes to the problem they aim to solve. They lack features that promote self-awareness and fail to effectively prevent smartphone-related distractions. The systems and methods of the present invention provide unique and improved approaches to overcome these deficiencies and pitfalls by providing a non-negotiable, automated solution that blocks app access when the vehicle is in motion, eliminating the temptation to use the phone altogether. This non-negotiable feature does not give the driver a choice to block or unblock the apps while driving—the apps are automatically blocked and cannot be overridden and driver app cannot be removed while driving. The system also educates users by providing real-time feedback on driving habits, fostering self-awareness and promoting long-term behavioral change in driving safety. This comprehensive approach addresses the core issues of accidents caused by driver behavior especially by driver distraction. This can be used for teenagers, young adults, seniors, bus drivers, such as school bus drivers, truck drivers, fleet drivers, etc.

The systems and method of the present invention, rather than hiding the apps as in current systems which can simply be overridden by the driver, actually block the apps to deny access to the driver.

The prevention of driver distraction is achieved by the initial blocking of other mobile applications on the driver's smartphone when the vehicle speed exceeds a predetermined threshold. This provides real time safety. The prevention of driver distraction is also achieved via data collection and storage on the mobile device which is later evaluated to inform the driver. This is also discussed in detail below.

In preferred embodiments of the present invention, various aspects of driver behavior are evaluated and scored to effect different system functions and to inform the data recipient. Note as used herein, the term "data recipient" refers to an individual or company that receives the data of the driver's behavior monitored by the system of the present invention and is typically remote from the vehicle, i.e., outside the vehicle at a remote location. The data recipient can include, but is not limited to, for example, parents, guardians, bus companies, fleet companies, bosses/employers, insurance companies, etc. The "data recipient" is also referred to herein as the "data monitor" or "interested party" or "third party observer" or "third party monitor".

Further, in preferred embodiments, the system can be preset with a desired level of security/strictness monitoring based on the needs of the data recipient. Thus, a spectrum of activation and monitoring can be utilized, as described in detail below.

The mobile app of the present invention can also have education and training features to improve overall driving behavior to inform the driver for subsequent vehicle operation. This is also discussed below. It can also have features such as 1) exam prep to help prepare for written and driver exams by providing educational material on traffic signs and local traffic laws and regulations, helping them practice while gaining an understanding of the laws that keep motorists safe; and 2) training and guidance on safe driving habits and techniques to help them gain an understanding of how to drive responsibly and reinforce these healthy habits while they progress and spend more time on the road.

The mobile app of the present invention in preferred embodiments is a "local-first" app designed to deter and reduce distracted driving by blocking apps and phone usage on a smartphone while driving. It is a driver-specific app independent of any specific vehicle. With local-first, the client-side application code works directly with a local, embedded database inside the smartphone, and does not require a backend or the cloud to work. For this reason, local-first apps feel instant and work offline-because you read and write data without going over the network which is better for a user. Local-first includes the ability to work offline and collaborate across multiple devices, while also improving the security, privacy, long-term preservation, and user control of the data. That is, the user's data is retained by the user under his/her control in the smartphone and not sitting in a cloud system that can be accessed illegally by unauthorized users. Additionally, when an app is cloud-based, its performance is limited by the speed of its connection to the central server and how quickly that server can reply. With a local-first app, the user's device runs all the code. The better the smartphone is and gets, the more the app can do.

Note all IOS and Android smartphones are supported by the app of the present invention, and should have at least the following: Mobile Network, Data Plan, GPS, Bluetooth, camera, Accelerometer, and Gyroscope.

Turning now to the flow charts (flow diagrams) and particular embodiments of the present invention, details of the various embodiments of the present invention will now be described. It should be understood that the flow charts/diagrams represent the operations as a sequential process to show the order of executed operations. Some of the operations can also be executed in parallel such as the data transmission of FIG. 4 to the various recipients. Note the various sequences of the systems described herein are performed by the mobile application working in conjunction with various built in features (software/hardware) of the mobile device itself.

With initial reference to FIG. 1A, the system 100 of the present invention in its broadest terms comprises an initial registration/enrollment procedure 101, request for access to device settings 102, detection of vehicle motion 103, initiation of blocking of the smartphone applications 106 once the vehicle is in motion and monitoring of the driver behavior 108 for real time and post driving analysis. For verification of identity for registration, the user/driver registers by taking a picture of their driver's license and of themselves, providing their email, phone number, and the email and phone number of the user's intended data recipient(s), e.g., parent, guardian, employer/boss, etc. The user's identity is then stored. Note the driver, not the vehicle is enrolled/registered. Other forms of verification/identification are also contemplated. The monitoring of the driver's behavior is discussed in detail below. Identity verification can provide an additional level of security to confirm the driver's identify before each driving event. The stringency of identification can also vary. The registration can also include requesting authorization of the app to acquire family controls entitlement to the app.

In the alternate embodiment of FIG. 1B, the sequence of steps is the same as in FIG. 1A except for the addition of selection of the level of registration 104 (level of strictness). That is, this level of strictness selection 104 is an optional feature of the system such that the system could alternatively be provided without such feature and only one level of security provided with the mobile application as in system 100. The level of security/strictness selected can correlate to the driver preferences and/or the data recipient preferences. The strictness selected provides the level of driver behavior monitoring and level of blocking of other apps. The operation of such selected strictness levels is discussed in more detail below.

The systems of FIGS. 1A and 1B block the mobile device while the car is in motion, (in some embodiments any motion), only allowing emergency and select authorized incoming calls such as from parents or a boss, and outgoing emergency calls to emergency services and to the parent/boss number which are the only numbers displayed on the screen while the screen is in the locked condition. In the case of an outgoing call to a parent/boss, in preferred embodiments it must be preceded by a call to the emergency services. The emergency notifications can be provided by the user in the initial registration wherein emergency contact numbers are inputted or alternatively the data recipient can automatically be the emergency contact, with the contact information stored in memory in the computing device (mobile device) of the driver. Such third party contact can include automatic notification of an emergency service, e.g., 911 dial. The emergency calls can be initiated by the driver in some embodiments or automatically initiated upon accident detection in other embodiments. In the former, it is recommended that the driver, if possible, stop the vehicle before making the emergency call. It is also envisioned that both driver initiated emergency calling and automatic calling are enabled.

Figure 2:
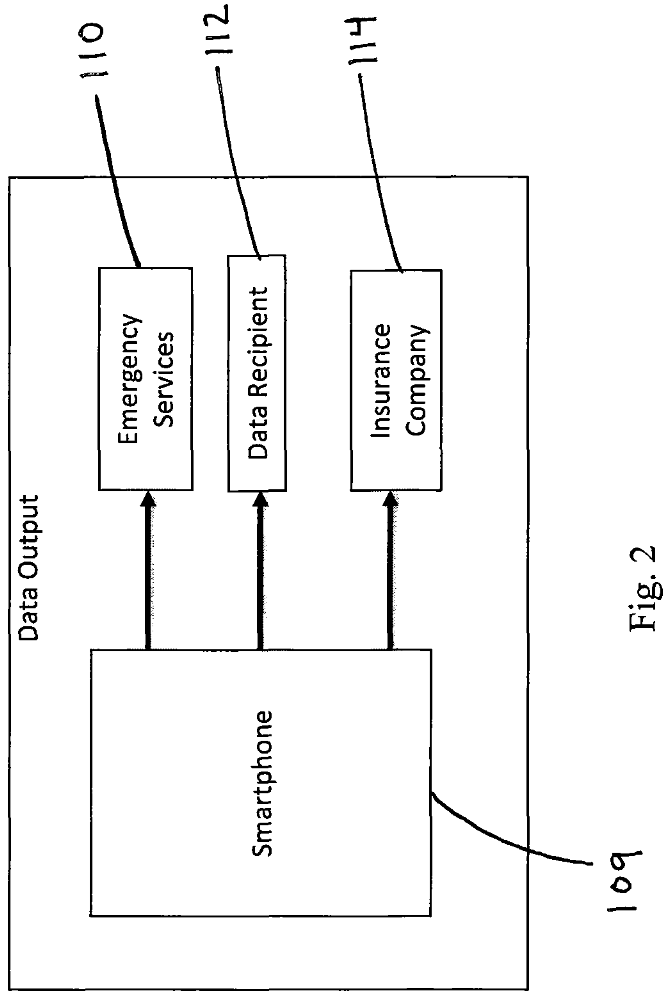
FIG. 2 is a flow chart showing data output from the driver's smartphone during vehicle operation in accordance with an embodiment of the system of the present invention.

The system collects the data and transmits the data from the smartphone 109 to the data recipient 112 (see FIG. 2). The data can be transmitted to an insurance company 114 in some embodiments, the benefits of which are described below. Certain data, such as location of the driver and certain driver behavior and vehicle movements can be transmitted to emergency services 110, effectively overriding the blocking of calls. The location of the driver can be detected at any point in time using GPS, cell tower, Wi-Fi, etc. That is, when the vehicle motion commences, the smartphone apps are blocked, including incoming and outgoing calls, except for outgoing calls to emergency services. Further, in some embodiments, if unusual or hazardous movements of the vehicle are detected, such as abrupt deceleration or other accident detection, the system can automatically initiate a call to an emergency service number, and the GPS location of the vehicle also transmitted to the called number. Accident detection can include for example harsh braking to zero, going off the road where no roads are shown, deploying of vehicle airbags and deploying of vehicle sensors indicating an accident has occurred. Other accident indicators to trigger an emergency are also contemplated.

The location of the vehicle in case of an accident can be tracked (using real time data) and reported, and in some embodiments, reported only as authorized by the driver.

The data can be stored in memory on the mobile device, and the memory can be for example random access memory (RAM) for short term calculations, for example, processed by the CPU, and stored in non-volatile computer readable storage medium for long term usage. The term "computer readable storage medium" as used herein includes any medium that is capable of storing or encoding a set of instructions for execution by the computer device performing the operations herein.

The system software includes one or more software programs/applications (also referred to herein as the "driver application" or "driver app") in the form of code written in one or more programming languages executable in the mobile device processor to carry out the operations described herein. The driver app includes algorithms for assessing and comparing driving parameters with threshold values and for interpreting driving parameters and calculating ratings in the form of a driving index as described in detail below. The processor can be any processor, e.g., a microprocessor, which can control the operation of the system, and is coupled to the memory (storage) medium. The processing logic receives the behavioral data, analyzes the data, determines presence of behavior outside a desired parameter based on a comparative analysis and/or a rating system/index, determines presence of an emergency situation, etc. The system also utilizes aspects of the mobile device software and hardware including accelerometer, locator, speedometer, etc. The driving index is created by a scoring of aspects of driving behavior, described in detail below.

The system can also include time data identifying the time associated with various events to track for example the time of various driving behavior, such as driver distraction by not focusing on the road ahead.

The system can also create and maintain a driving safety profile of the user, which can be made available to the insurance companies on demand, giving them the necessary data to determine year to year whether they will keep providing coverage, determine premium costs, or canceling the risk. This can be achieved via Application Programming Interface (API) polling.

With API, the insurance company servers send requests for data to an endpoint (smartphone) repeatedly. It then compares the requests to see if any of the information has changed. The requests can be at regular intervals or made with randomized delays or exponential backoff APIs (in situations where the API server is temporary unavailable or overwhelmed). This process enables two software components to communicate with each other using a set of definitions and protocols. This can occur, for example, in a similar way the weather bureau's software system contains daily weather data. The weather app on your phone "talks" to this system via APIs and shows you daily weather updates on your phone. Thus, as an alternative to receiving real-time data updates, the repetitive requests at regular or randomized intervals allows retrieval by an insurance company of updated information/data.

The driving profile created for the insurance company can be based on the index/scoring system described below which is utilized by parents or company bosses. Alternatively, a separate scoring system of select behaviors, i.e., a subset of the all the calculated behaviors, can be utilized for insurance companies, with data analyzed only for behaviors of particular interest to the insurance company. Thus, a different algorithm can be utilized for the quantification/scoring of driver behavior for insurance company usage/analysis.

In some embodiments, once the driving (vehicle acceleration) is initiated, the system begins monitoring of the driver behavior and blocking the other apps on the driver's smartphone. In other embodiments, depicted in the flow diagram of FIG. 3, data of driving behavior is not collected and the other apps on the phone are not blocked until the vehicle motion exceeds a threshold value. Note the term "other apps" utilized herein denotes the apps on the mobile device other than the driver app of the present invention. Thus, other apps can include internet search, e-mail, text messaging, weather, video, games etc.

Note the app can be continuously running in the background once initiated or in alternate embodiments configured so the user would need to open the app ach time to initiate the system.

Figure 3:
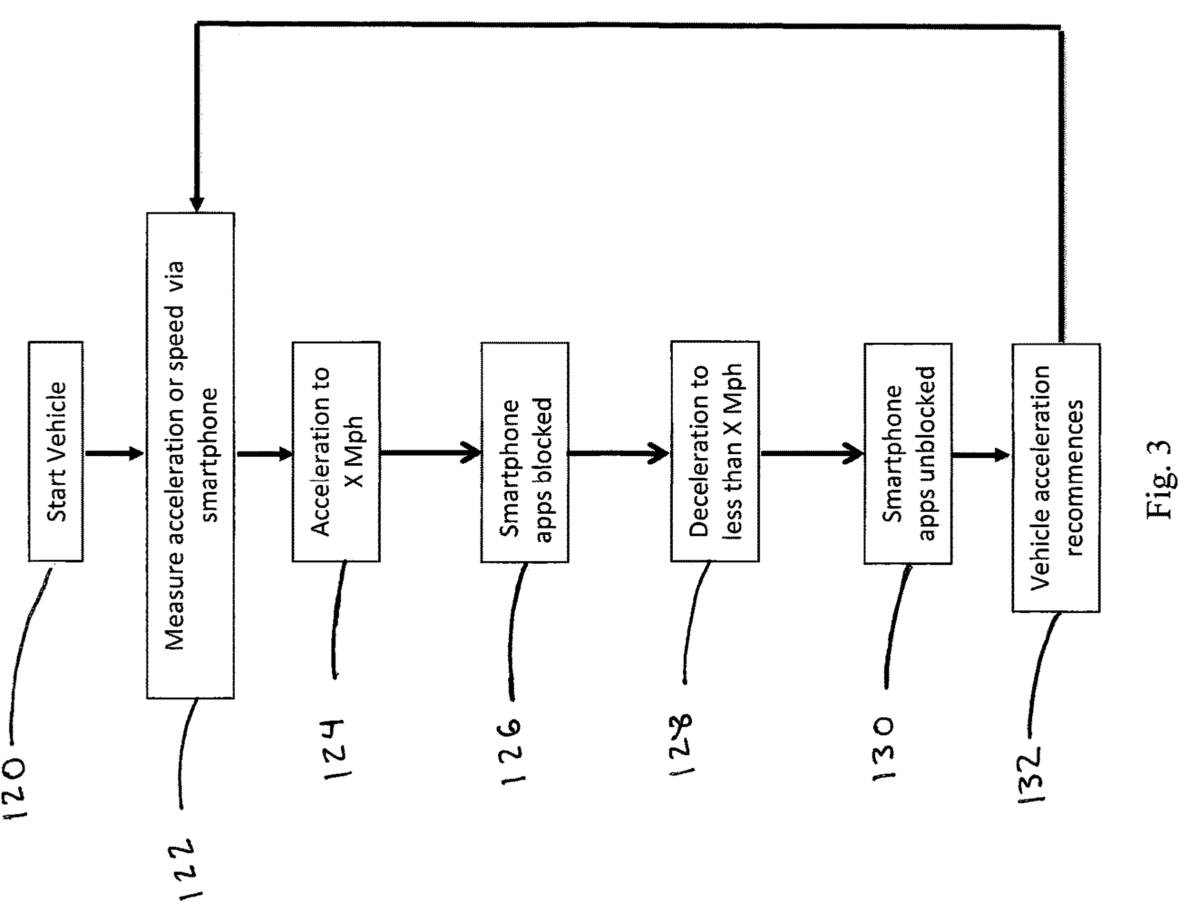
FIG. 3 is a flow chart showing initiation of the system of the present invention dependent on the determination of vehicle acceleration.

More specifically, with reference to the flow diagram of FIG. 3, after the vehicle is started 120 and driving commences, vehicle acceleration or speed is measured 122 by the smartphone and transmitted to the system and when the vehicle is in motion below X mph, the data is not collected by the system and the other apps are not blocked, since this is a relatively safe speed and driver distraction does not provide as much of a risk. However, when the vehicle accelerates to reach a speed of X mph (block 124), the smartphone other apps are automatically locked/blocked 126 and data collection commences. When the vehicle decelerates to less than X mph (block 128), the smartphone apps are unblocked (block 130) or alternatively only select apps are unblocked. When vehicle acceleration commences 132 and accelerates to X mph (returning to block 124), the apps are once again blocked until the vehicle decelerates to reach a speed of less than X mph (returning to block 128) wherein app usage is unlocked/unblocked (returning to block 130). (Note the terms "blocking" and "locking" the other apps are used interchangeably herein and both denote denying access and use/interaction with the app). Note in some embodiments, within 5 seconds of the vehicle coming to a full stop the system unblocks the apps.

Note that although X=10 mph (or about 10 mph) is the preferred speed, other speeds are also envisioned for activating/inactivating the systems.

The system utilizes the smartphone camera to monitor the driver's behavior. More specifically, the camera is used for eye tracking and/or detecting motions of the driver, e.g., head movement of head direction, to detect if the driver is not looking forward or paying attention to the road. The smartphone in these embodiments is preferably mounted to the dashboard in an orientation to detect driver eye positions and head motion/movements. An audible alarm or other warning/alert can be activated if the driver is not looking forward or paying attention to the road, as described in more detail below.

Alternatively, one or more cameras remote from the smartphone can form a secondary imaging device(s), or alternatively such imaging device can be used instead of the smartphone camera, to capture images of the driver's head and body and/or for eye tracking. Such "remote camera can be mounted within the vehicle. The remote camera can communicate via Bluetooth wireless communication with the mobile device to achieve the assessments and evaluation of driver behavior described herein.

The system also uses the accelerometer and GPS sensors in the smartphone (or any other GPS enabled computing device in the vehicle) to obtain necessary data to provide the location of the driver and vehicle, generating notifications for estimated time of arrival point to point, average speed, speed information per road segment, destinations visited, device usage while the vehicle in motion, excessive speed alarms, and unusual patterns of driving or vehicle movements, all used in the indexing calculated by the software of the system of the present invention.

In some embodiments, the foregoing notifications can also be used to generate an alarm for a potential carjacking or vehicle theft, and in further embodiments can be provided with capabilities to remotely deactivate the vehicle.

To achieve the foregoing notifications, GPS apps such as apple Maps, Google Maps, Waze, etc. are not blocked during vehicle operation. However, interaction with such GPS apps during operation of the vehicle is preferably blocked so therefore the driver would need to obtain driving information of the route and time to the destination prior to commencement of driving, or in the system 100' of FIG. 3 before acceleration of the vehicle to a preset threshold, e.g., 10 mph. Consequently, even if the driver does not have Bluetooth or an infotainment system in the vehicle, navigational maps can be displayed when driving; however, the driver would need to initiate navigation before starting the drive and the vehicle motion commencing (or accelerating to the predetermined speed as in the system of FIG. 3). Navigation tools and maps can also be used to help drivers plan their routes and avoid dangerous areas.

As described above, the system of the present invention includes a local-first (cloud independent) mobile app that leverages real-time data to analyze a driver's level of safety while driving generating a safety index, referred to as the "ROTAMMI INDEX," or more simply "RI.". The index is created by the data collected by the mobile phone utilized to compute a driving score.

More specifically, the app accumulates data in real time to generate the driver's ROTAMMI INDEX (RI). The RI correlates to a maximum number, e.g., 1,000 (although other quantifications for creating the scale for scoring are also contemplated) that shows how safe is a driver's behavior. It is generated in real-time locally by the app in the driver's smartphone by applying an algorithm which utilizes various scores for violations, e.g., usage of unblocked apps, not paying attention, speed, acceleration, cornering and braking. Thus, using real-time smartphone sensor data, the app analyzes a driver's driving behaviors on the road to rate how the driver is controlling the vehicle and the extent and frequency the driver is distracted.

For example, a rate of acceleration would be determined and scored dependent on the extent it exceeds a predetermined rate of acceleration, the predetermined rate of acceleration corresponding to a standard acceleration rate (threshold acceleration rate). In this manner, if the rate of acceleration exceeds the standard rate, a score is given, the score dependent on the extent the standard rate is exceeded, with a higher rate of acceleration given a higher score. It should be appreciated that the score can be based on the extent acceleration exceeds a threshold base or alternatively instead of a comparative analysis, each acceleration given a score wherein the scores correspond proportionally to the increase in acceleration but can increase a greater amount once acceleration exceeds a predetermined value. Speed can also be scored utilizing any of the foregoing calculation methods for quantification of the speed, e.g., comparative analysis or proportional allocation. For example, scoring of speed can be based on the extent the driver exceeds the speed limit (or exceeds the speed limit by a predetermined amount such as 8 mph for example). Likewise, calculations are also performed, utilizing the app algorithm, for braking and cornering, based on a comparative analysis to a threshold and scoring dependent on the extent it exceeds the threshold (standard/norm), or scoring all braking and cornering, with higher scores allocated to higher deviations as described in the foregoing.

The various violations/actions can be given equal weight. In alternate embodiments, specific violations or actions can be weighted differently. For example, in some embodiments, the majority of the weight for the RI can be placed on distraction-related violations such as placing/receiving calls and utilization of apps not allowed by Apple to be blocked. Further, accessing apps not allowed by Apple to be blocked can be weighted differently, depending on the app accessed by the driver. For example, texting can be weighted higher in the RI than receiving an incoming call, the former shown to be a more dangerous behavior during vehicle operation. In another example of different weighting for purposes of RI calculation/quantification, looking away from the road can be weighted different than rapid acceleration. As can be appreciated, these are just some examples of different weighting as the algorithm can be tailored to assign different weight to different behaviors.

Further scoring and calculation can be provided based on driver motion, e.g., driver's eye diversion from the road, head movement away from a forward "road following" direction, physically accessing the mobile device during driving, etc. The former can be scored based on predetermined deviation from the norm associated with safe concentration/viewing of the road, and such behavior can for example be scored by event and/or extent of the driver's movement and/or mobile device movement as detected by the smartphone camera and sensors.

Note that Apple (unlike Android) does not allow the blocking of native apps (Maps, Wallet, etc.) to the IOS. The system of the present invention blocks all other apps. However, to adapt to the Apple smartphone, the system utilizes the RI to improve driver behavior. Every time the user utilizes any Apple app while the vehicle is in motion a violation is logged and reported, adversely impacting their RI (which can also be reported to their insurance company as discussed herein). Violations are also generated for speeding, harsh acceleration, braking, cornering, etc. as use with the Android phones. Thus, in use of the system of the present invention will all smartphones, RI is calculated, assessed and transmitted to the designated recipient(s). Use of the system differs with regard to blocking of specific other apps which capabilities/allowances is dependent on the etc. user's particular brand smartphone.

In some embodiments, utilizing Apple native apps or any other app while driving which will not adversely impact the RI if the driver connects their smartphone via wireless (e.g., Bluetooth) or wired communication (e.g., USB) to their vehicle's infotainment system; however, the driver should initiate app usage before starting the drive and the vehicle initiating motion, because once a sufficient speed is reached, e.g., about 10, the apps will be blocked.

As can be appreciated, by quantifying these driving behaviors, the system and app builds a risk profile which characterizes the safe-driving behavior level of the driver, which can be provided in real-time to the driver and to a third party recipient such as a parent, guardian, employer, insurance company, as well as stored for further analysis.

The score/index can be calculated at the end of the driving event for evaluation. Additionally or alternatively, the score can be continuously calculated during the driving event such that if the score exceeds a threshold index, an alarm is sent to the driver. In some embodiments, the alarm can also be sent to the third party observer/designated data recipient in the same manner as emergency calls are made or via VOIP app services utilizing for example a Callkit framework. In other words, where the score is calculated at the end of the driving event, the score is stored for later evaluation which can be used for educational purposes and informational purposes; where the score is cumulatively calculated in real time, the score is used to alert/warn the driver during the driving event. A driving event can be considered the time period from commencement of the drive to the time the driver's destination is reached and the vehicle is turned off.

The scoring can also be used to detect an emergency event if the algorithm generates an extremely high score indicating an impact event, which will instantaneously increase the RI exponentially to a warning level so the emergency features, e.g., emergency call, can be activated, and in some embodiments an emergency call immediately made to an emergency service center and to the registered third party monitor of the event.

Along with storage of the RI and underlying data collected to derive the RI, a driver profile can be generated and stored for later utilization for comparative analysis to assess driving behavioral improvements. This can help in educating and training the driver.

It should be understood that various algorithms are envisioned to compute the index (RI) and the present invention is not limited to a single algorithm. For example, the algorithms can provide sub-indexes to calculate scores for only pre-selected behaviors. The algorithms can for example vary dependent on the weight desired to be given to a specific driver behavior. Additionally, different recipients might be more concerned with different adverse behaviors so the algorithms can be tailored to assign different weights to different behaviors dependent on the data recipient's needs. Thus, it is also envisioned that different indices can be created for different data recipients. For example, an insurance company as the data recipient might want certain behavior weighted differently, based on the computations of driver behavior across a large number of drivers (actuarial computations) than a parent or an employer of a fleet of vehicles. Further, machine learning can alter the algorithms to accommodate various patterns and behaviors based on collected data from multiple drivers and can for example adjust the threshold values utilized in the comparative analysis. Machine learning can also be utilized to alter the algorithm for a particular driver based on prior driving behavior.

Figure 4:
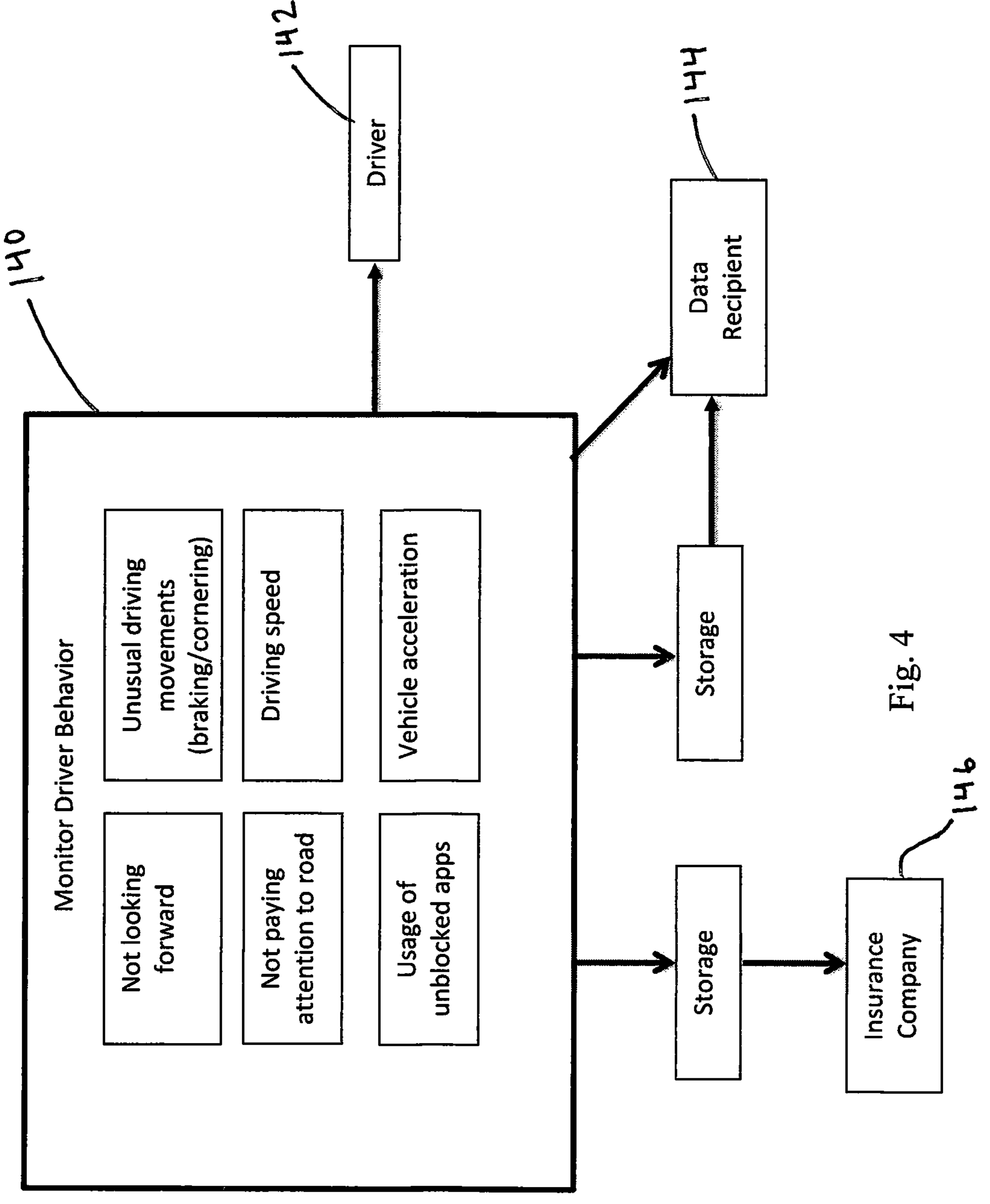
FIG. 4 is a flow chart of the system of the present invention showing data output responsive to evaluation of driver behavior during operation of the vehicle.

The flow diagram of FIG. 4 provides a summary of the monitoring of driver behavior and the multiple data outputs of the system. The driving behavior in block 140 includes, but is not limited to, the driver not looking forward, the driver not paying attention to the road, unusual patterns of driving or vehicle movements such as unusual braking patterns, excessive driving speed an unusual or excessive vehicle acceleration.

More specifically, after each trip, the app will show a map of the route, the distance traveled and driving events along the way. It will show the driver where speeding occurred (e.g., when a driver exceeds the speed limit (or exceeds the speed limit by 8 miles per hour or more utilizing the legal nationwide threshold of 65 MPH) and where faster acceleration occurred than is generally considered safe. With regard to braking, it will show the driver if any fast or hard stops were made. With regard to cornering, it will show the driver where along their route any quick or sharp turns were made. The app. can also show where (and when if time data is utilized) violations such as driver distractions occurred, such as the driver utilizes apps that can't be blocked such as Apple native apps, or engages in the placing or receiving of phone calls while driving. As noted above, phone calls via Bluetooth connectivity either via an infotainment system or on the phone itself are logged and will impact the driver's safety driving score). It will also show the calculated index (RI). As can be appreciated this will also provide a driver educational tool for teaching the driver about safety.

Figure 6A:
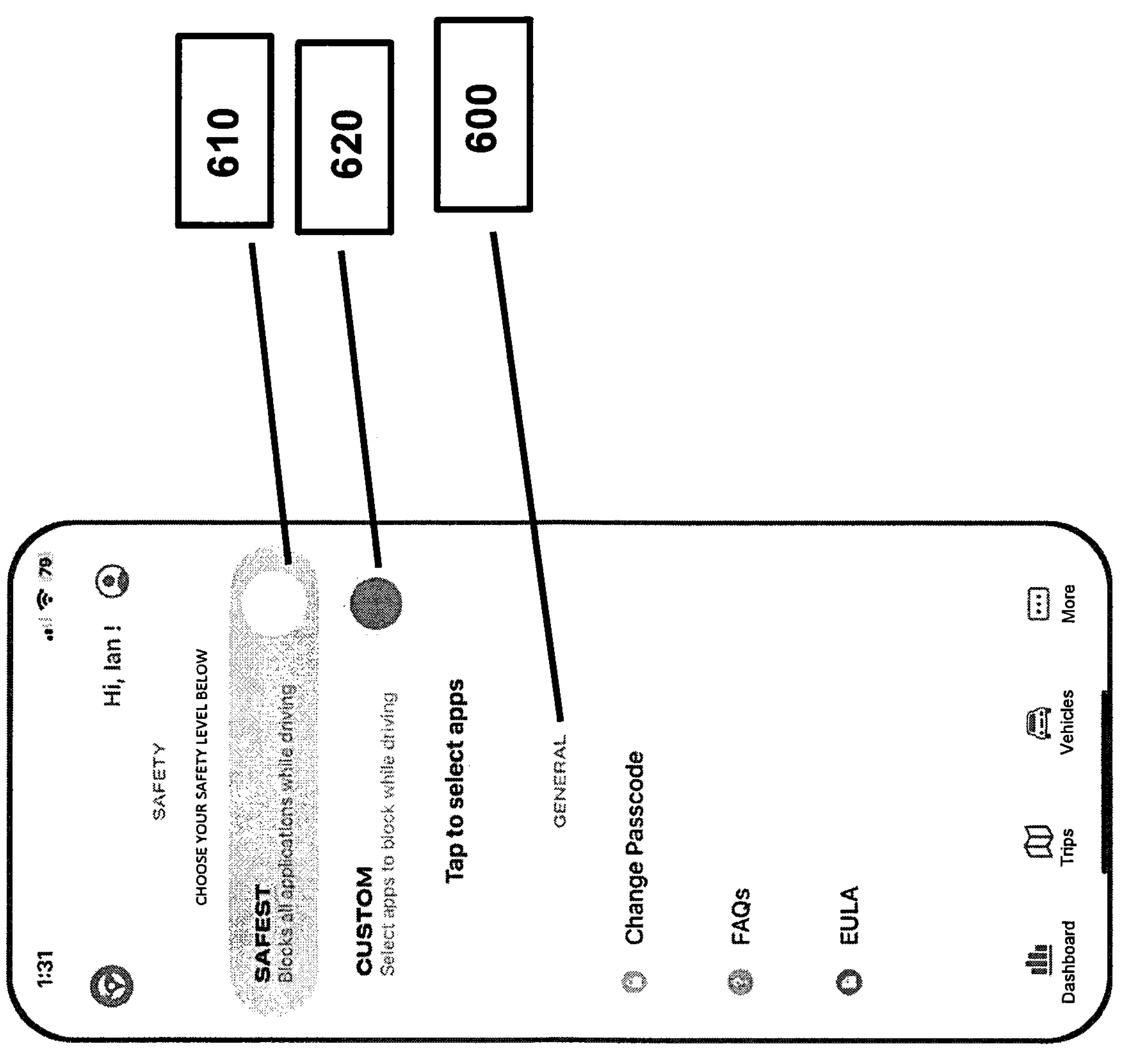
FIG. 6A is a screenshot of a user interface for selecting a restriction level in accordance with an embodiment of the present invention.
Figure 6B:
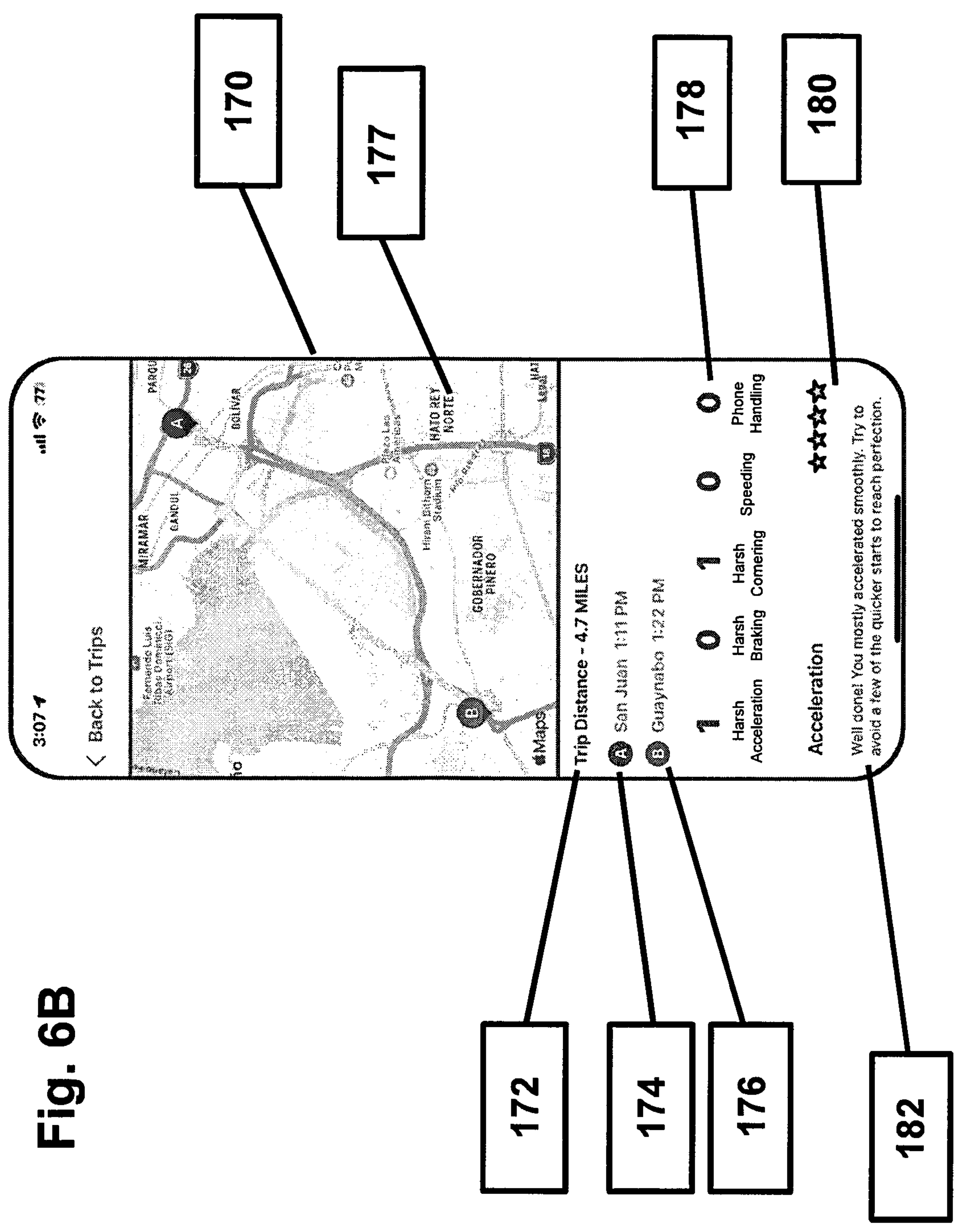
FIG. 6B is a screenshot showing an example of a display on the user's smartphone of collected data for a trip including destination, trip distance and driver behavior.

FIG. 6B provides an example of a display 170 on the driver's smartphone showing data from a specific trip. The display shows the trip distance 172 (4.7 miles), the starting point 174 (San Juan) and the end point 176 (Guaynabo) for the trip, a map of the trip 177 and the number of unusual driving patterns 178 (one harsh acceleration and one harsh cornering). A four star rating of acceleration 180 is displayed. The display can also include a rating and explanation/assessment 182 of the driving behavior and tips to improve driving behavior. It should be understood that FIG. 6B provides by way of example data from a trip for ease of explanation. It should be appreciated that the data can be displayed in a different format and/or in a different way than in display 170.

The collected trips data (violations, speed, acceleration, braking, cornering, etc.) and RI can be stored not only for single trip but for a series of trips over a specified time, e.g., over the past day, week, and month for each driver. As noted above, drivers, such as teenagers, will have their data also provided automatically to their parents and/or legal guardians. Other drivers could also have their data automatically sent to employers (e.g. vehicle fleet managers) or other data recipients as described herein. This is depicted in FIG. 4, wherein the data is sent to the driver 142, stored for the data recipient access and sent directly to the data recipient 144 and stored for access by the insurance company 146.

Figure 6C:
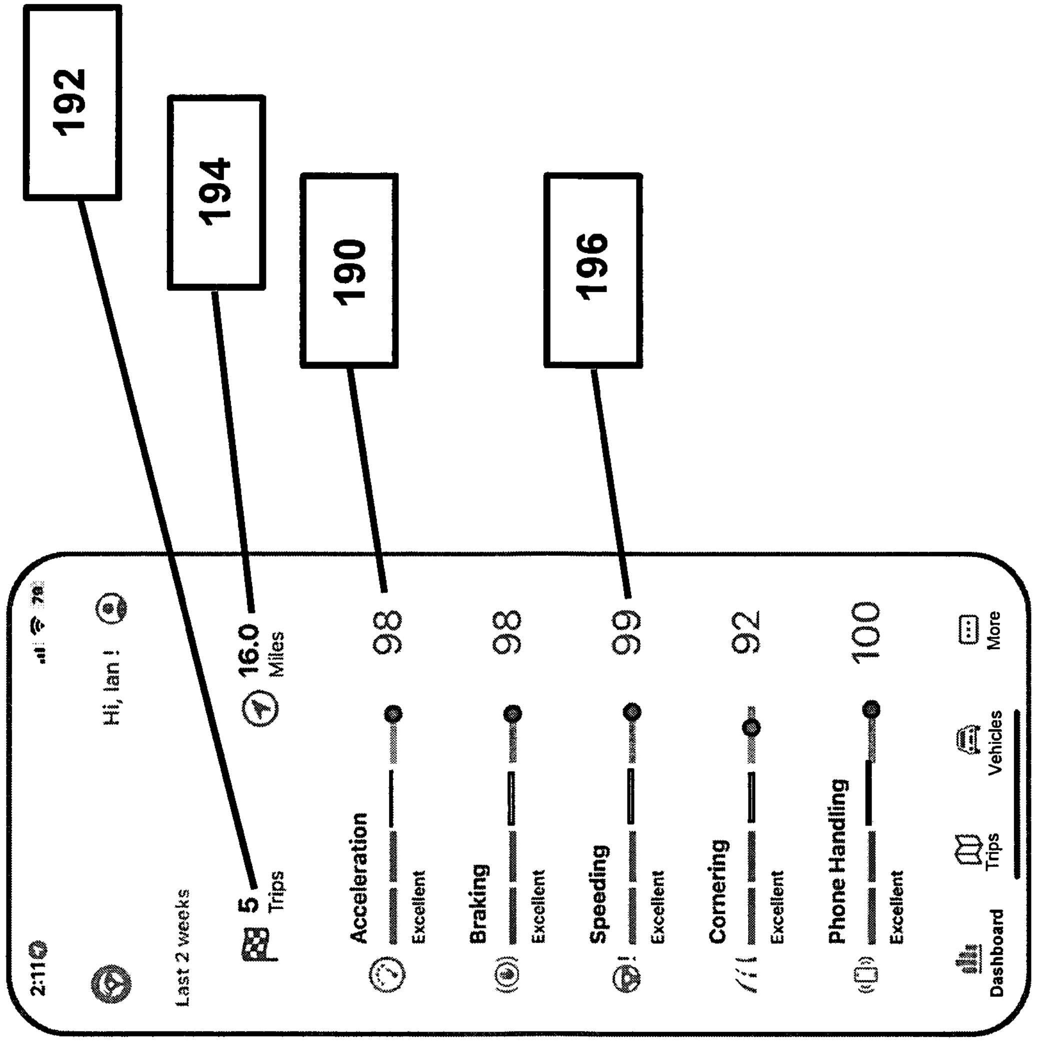
FIG. 6C is a screenshot showing an example of a display of indexing/scoring of a driver's behavior over a two week period.

FIG. 6C provides an example of a display 190 on the driver's smartphone showing data from a series of trips over a two week period. The display 190 shows the cumulative total over the two week period of the number of trips 192, the number of miles driven 194, and the scoring of driving behavior 196. In the display depicted, phone handling had the highest score (100) and cornering had the lowest score (92). In this display, the scoring is based on a perfect score being 100, however, it should be appreciated that scoring can be based on another scale. The display can also include a written explanation/assessment as in display 170. It should be understood that FIG. 6C provides by way of example data from five trips for ease of explanation. It should be appreciated that the data can be displayed in a different format and/or in a different way than in display 190.

In some embodiments, the system is linked with the driver's automobile insurance company. As described above, since the system uses a local-first app, communication with the insurance company is achieved via API (Application Programming Interface) polling—the insurance company servers send repeated requests for data to the smartphone. A code can be provided by the driver's insurance company to link the app to the driver's insurance policy. The data collected and the RI is stored/maintained inside the driver's smartphone and shared with the driver's insurance company. The data collected can be used by the driver's insurance company to calculate the amount of the driver's discount and set insurance premiums. Note this feature of communication and sharing data with the insurance company is an optional feature and some versions of the system do not include this.

As discussed above, that the app of the present invention blocks all the apps on the Android phone but it does not block the Apple native apps, because Apple does not allow it. In this instance, as discussed above, the data collection/evaluation and RI index is utilized to monitor driving behavior. That is, the usage is logged and reported to the data recipient and can also be reported to the driver's insurance company as violations. Such usage will also adversely impact the RI which can be used by insurance companies to set insurance costs, thus providing an incentive to the driver to avoid such distractions/violations and unsafe driving behavior. Fewer violations and lower RI could also be used by insurance companies to provide insurance rate discounts and provide an incentive to change at-risk driving behavior. Conversely, if the driver uses the Apple native apps while driving and that is logged and reported to the insurance company, it will likely increase the driver's insurance cost. That is, an insurance company will know if their insured driver is using the app of the present invention while driving and can determine the application usage, graph it and determine uptime and downtime for each individual user for an insurer to validate usage in accordance to their policy requirements and honor or cancel the policy premium discount provided to the driver based on their commitment to use the app while driving.

Figure 5:
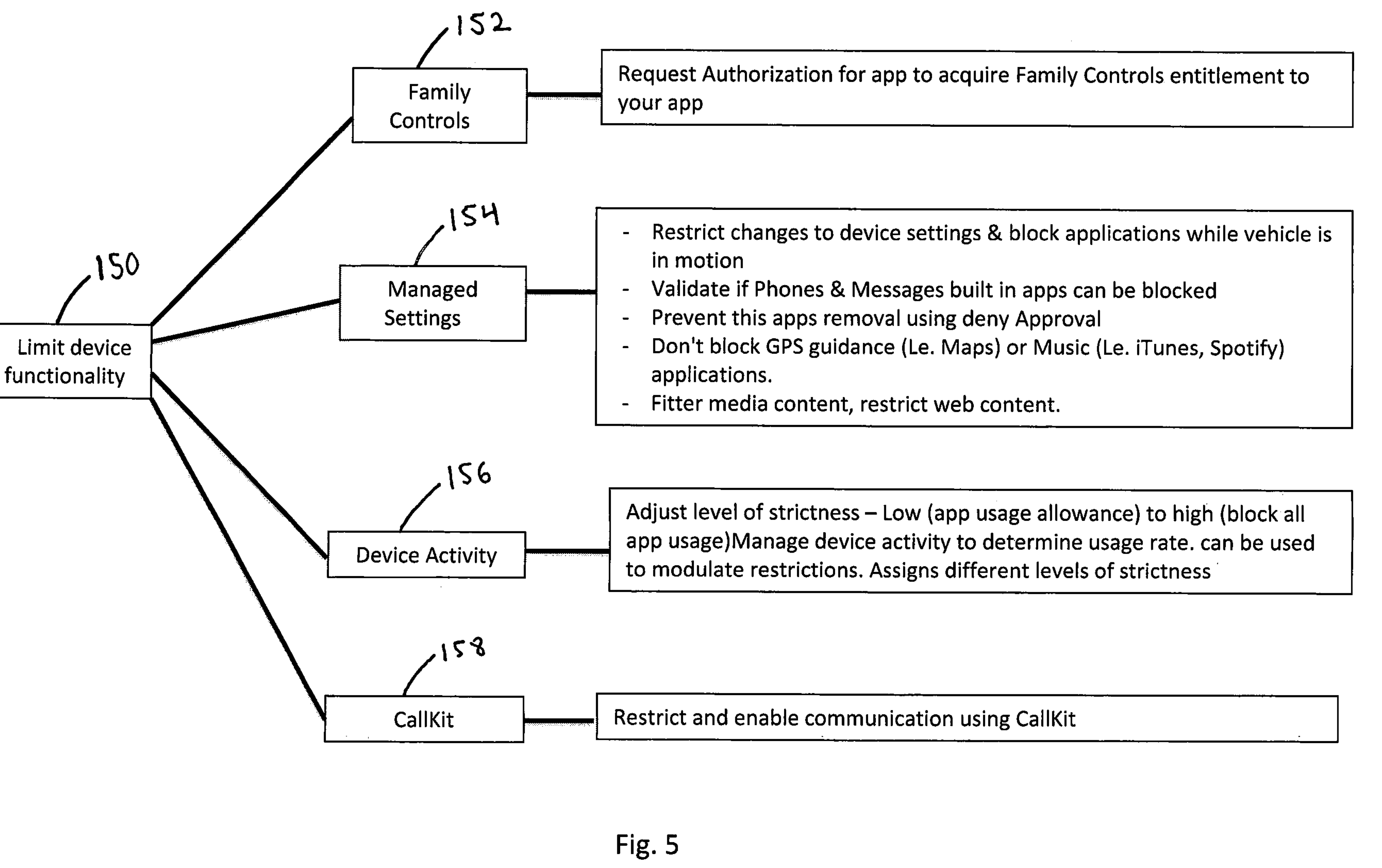
FIG. 5 is a flow chart showing limiting of device functionality in accordance with the system of the present invention.

FIG. 5 provides an overview of how the system of the present invention limits device functionality 150. There are four segments/aspects: 1) Family Control 152; 2) Managed Settings 154; 3) Device Activity 156; and 4) CallKit 158. For family controls 152, after registration, the user requests authorization for the app to acquire Family Controls entitlement to the app. (Requesting permission on Apple Developer portal before using this entitlement is required).

For Managed settings 154, the features include restricting changes to the device settings and validating if phone and messages and built in apps can be blocked, and blocking the phone, messaging and such applications while the vehicle is in motion (or accelerates to a predetermined speed as described above). Managed settings 154 also include preventing removal of the app utilizing Deny AppRemoval so the app can't be uninstalled. Other Managed Settings can include not blocking GPS guidance, e.g., MAPS or Waze, or Music, e.g., iTunes, Spotify, although interacting with GPS and not blocking Music while driving could be adversely recorded as a violation in the RI calculation. In some embodiments, the Managed Setting also enable filtering of media content and restricting web content.

Device Activity 156 relates to the assigning and adjusting the level of strictness/restriction. This can run the spectrum from a low less restrictive level to a high more restrictive level. At the low level, usage of the smartphone apps is allowed while the vehicle is in motion and activity and usage are merely monitored, but violations are tracked and recorded, generating alerts/alarms and adversely affecting the RI. At the high level, all app usage is blocked during motion of the vehicle. Levels in between (medium levels) can block certain apps while allowing usage of others. Device activity can also be used to determine usage rate and restrictive levels can be modulated and assigned accordingly. In some embodiments, three different levels of strictness/safety enforcement are provided: pass, strict and custom.

FIG. 6A is a screenshot of an example of a user interface 600 on the driver's smartphone for selection of the restriction level. The driver can select the safest level 610 or the custom level 620 wherein specific apps are selected for blockage of exemption from blockage. Other display screens for restriction levels are also contemplated.

CallKit 158 restricts and enables communication using call API's which allow calls using internet based service like WhatsApp.

As can be appreciated from the discussion above, various sequences of the systems described herein are performed by the mobile application of the system of the present invention. For example, the driver registers on the mobile application, the data is collected by the mobile application, the RI is determined and quantified by the mobile application, the calculation/scores are transmitted by the mobile application, the alerts/warnings are transmitted by the mobile application, etc. The mobile application works with the camera, GPS, accelerometer and other features of the mobile device to perform operations of the systems and methods described herein to effectively track and record distracted driving behavior.

The systems of the present invention can be configured to identify a particular user based on biometric features utilizing the smartphone camera, or alternatively or in additional, another camera positioned in the vehicle. Such user identification can be used to set parameters tailored specifically to the driver and enhanced over time through machine learning. For example, contextual data providing a sense of historical patterns and routines of a driver, with corresponding timestamps, can be formulated. Utilization of biometrics, i.e., implementation of a biometric authentication platform, can be in accordance with, by way of example, the system described in U.S. Pat. No. 10,413,377 which would provide biometric monitoring to capture biometric information of the driver to detect for example sleepiness or intoxication. Biometrics or other measurement/analytic systems can also be utilized in conjunction with the system of the present invention to detect various conditions (physical and mental state) of the driver.

Although as described herein the data is received, evaluated and transmitted from the mobile device to the computing device of remote interested party (data recipient overseeing the driver), in alternate embodiments, a system server can be utilized. In such embodiments, the system server can be any computing device and/or data processing apparatus capable of communicating with the driver's mobile device and remote computing devices and receiving, processing, storing and transmitting electronic information encompassing driving behavior, RI index, and other features and parameters described above. Such computing device, utilized by remote recipients, can include a display screen to show a graphical user interface depicting the various driving behaviors, the calculated driving index (RI) x, etc.

When the data receiver (interested party) receives data from multiple users/drivers, such as a manager of a vehicle fleet, the data can be compartmentalized for limited access. However, the data can in some embodiments be utilized for comparative analysis to assess driving behavior of multiple employees for employment evaluation, employed education, etc.

To protect driver information, in some implementations, data encryption can be utilized, ensuring data is accessible only to the driver and designated third parties.

In some embodiments, the parent, guardian, fleet manager or other interested overseeing party would register the app on the driver's smartphone instead of the driver. This would enable such interested party to ensure control of Managed Settings such as prohibiting removal of the driver app of the present system.

In some embodiments, the location of the driver within a vehicle is detected. That is, the position of the driver with a phone inside a vehicle is determined when the individual is in his own vehicle as a passenger and not driving or when the individual is inside another vehicle as a passenger and not the driver. Thus, the phone can be used when the individual in the vehicle is not driving.

As can be appreciated from the above, the present invention provides a system for reducing and preventing vehicle accidents is utilizing the system application app executing on the smartphone the series of the operations of and utilizing the software and algorithms of the present system, in conjunction with the driver's mobile device features.

Although the apparatus and methods of the subject disclosure have been described with respect to preferred embodiments, those skilled in the art will readily appreciate that changes and modifications may be made thereto without departing from the spirit and scope of the present disclosure as defined by the appended claims.

Additionally, persons skilled in the art will understand that the elements and features shown or described in connection with one embodiment may be combined with those of another embodiment without departing from the scope of the present invention and will appreciate further features and advantages of the presently disclosed subject matter based on the description provided.

Throughout the present invention, terms such as "approximately," "generally," "substantially," and the like should be understood to allow for variations in any numerical range or concept with which they are associated. For example, it is intended that the use of terms such as "approximately" and "generally" and "substantially" should be understood to encompass variations on the order of 25%, or to allow for manufacturing tolerances and/or deviations in design. By way of example, an angle of substantially 100 degrees would encompass an angle of 75 degrees as well as an angle of 125 degrees.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A method for reducing driver distraction during operation of a vehicle, the method comprising:

a) blocking use of one or more apps on a smartphone while the driver is operating the vehicle, the blocking performed by a local first driver specific app independent of a specific vehicle;

b) monitoring a driving behavior of the driver during operation of the vehicle;

c) accumulating data in real time of the driving behavior and generating a calculated index of behavior to provide a driver score; and d) comparing the driver score to a desired score and generating an alarm if the driver score is outside the desired score;

wherein the calculation of the score weighs driver behavior, driver distraction, and driver utilization of apps that are not blocked while the driver is operating the vehicle.

2. The method of claim 1, wherein the step of blocking use of the one or more apps a automatically occurs when the vehicle exceeds a threshold speed.

3. The method of claim 1, wherein when the one or more apps are blocked in response to operation of the vehicle, emergency directed calls are still enabled for activation by the driver in case of an emergency, thereby overriding blockage of calls from the smartphone, wherein the score is used to detect an emergency event if the score reaches a predetermined high score, enabling emergency features of the app.

4. The method of claim 3, further comprising automatically detecting one or more of a change in G-Force pressure, deployment of airbags or deployment of a vehicle sensor to alert emergency services to a location of the vehicle.

5. The method of claim 1, wherein a camera of the smartphone monitors the behavior of the driver, the behavior being a direction the driver is looking during operation of the vehicle, wherein the smartphone is removably mounted to a dashboard of the vehicle.

6. The method of claim 1, further comprising a) identifying a GPS location of the driver and vehicle and generating notifications for estimated time of arrival and unusual patterns of driving to a remote data recipient, thereby assessing a speed of the vehicle during a trip, and b) displaying at the end of the trip a map of a route of the drive and driving events along the route indicative of driver behavior during the trip.

7. The method of claim 1, further comprising generating alarms if the driving behavior is outside a predetermined parameter, wherein the alarm is transmitted to one or both of the driver and a computing device remote from the vehicle to inform a remote data recipient.

8. The method of claim 1, further comprising generating an alarm if the driver exceeds a speed limit, wherein the alarm is transmitted to one or both of the driver and a computing device remote from the vehicle to inform a remote data recipient.

9. The method of claim 1, wherein the index is stored on the smartphone and transmitted to a remote computing device outside the vehicle for observation by a remote data recipient.

10. The method of claim 9, wherein the step of calculating the index comprises scoring various parameters of driving behavior wherein at least one of the various parameters is allocated a different weight than other parameters in calculating the index in accordance with a ranking of dangerous behavior, and wherein higher scores are allocated to higher deviations from thresholds and the score can be continuously calculated during the drive and if the score exceeds a threshold score during driving, an alarm is sent to the driver.

11. The method of claim 10, wherein the various parameters scored for creating the index include one or more of the following: speed, acceleration, cornering and braking, and a second score is generated based on a subset of the various parameters of interest.

12. The method of claim 1, wherein the driving behavior is determined by a series of measured parameters, the parameters stored in memory on the smartphone, the measured parameters utilizing a predetermined index of values, and the data is transferred in real time to a data recipient remote from the vehicle, wherein data is not collected when a vehicle speed is below a predetermined speed and when the vehicle re aches predetermined speed, data collection commences.

13. The method of claim 1, wherein data collected of the driver behavior is communicated to an insurance company in response to data requests at intervals sent to the smartphone of the driver.

14. The method of claim 1, further comprising:

a) tracking a location of the driver of the vehicle and generating notifications of unusual patterns of driving to the driver within the vehicle and to a remote computing device outside the vehicle;

b) wherein data is collected in real time on driver distraction by a computing device within the vehicle during operation of the vehicle;

c) wherein the data is accessible to the driver and an individual remote from the vehicle; and d) prior to commencement of driving, selecting a level of strictness correlating to driver or data recipient preferences, the level of strictness providing a level of driver monitored behavior and level of blocking of the one or more apps.

15. The method of claim 14, wherein the data collecting commences once vehicle operation is above a predetermined speed and data is not collected when operation of the vehicle luces to below the predetermined speed, and data collection and blocking use of the on or more apps on the computing device within the vehicle automatically resumes when the vehicle returns to operation above the predetermined speed.

16. The method of claim 14, where a score of driving behavior calculated based on the collected data, and the score is stored on the smartphone and/or transmitted to the remote computing device outside the vehicle for observation by the remote individual and wherein collecting data includes tracking the driver's speed, acceleration, cornering and braking.

17. A non-transitory computer implemented system executable by a processor, the system comprising executing the operations of:

a) registering driver information on a computing device;

b) blocking select apps on the computing device within a vehicle while the driver is operating the vehicle beyond a threshold speed, the blocking performed by a local first driver specific app independent of a specific vehicle, c) collecting data on driving behavior of the driver during operation of the vehicle beyond the threshold speed, wherein data is not collected by the system when the vehicle speed is below a predetermined speed and when the vehicle reaches the predetermined speed data collection commences and when the vehicle decelerates below the predetermined speed, the select apps are unblocked;

storing the data in memory on the computing device; and transmitting the data to a remote computing device for monitoring of the data to assess driving behavior of the driver.

18. The system of claim 17, further comprising generating a first score based on one or more parameters of the driving behavior, the first score transmittable to the remote computing device of a data recipient remote from the vehicle.

19. The system of claim 17, further comprising generating alarms if driving behavior is outside a predetermined parameter or a calculated score during driving is outside a predetermined score, wherein the alarm is transmitted to the driver.

20. The system of claim 18, further comprising generating a second score, the second score computed based on a subset of the parameters of driving behavior utilized to compute the first score.

* * * * *